US012730398B2

(12) United States Patent
Ishida

(10) Patent No.: US 12,730,398 B2

(45) Date of Patent: Sep. 8, 2026

(54) FUSER

(71) Applicant: BROTHER KOGYO KABUSHIKI KAISHA, Nagoya (JP)

(72) Inventor: Kei Ishida, Inuyama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/810,100

(22) Filed: Aug. 20, 2024

(65) Prior Publication Data

US 2025/0076798 A1 Mar. 6, 2025

(30) Foreign Application Priority Data

Aug. 31, 2023 (JP) ................................ 2023-141647

(51) Int. Cl.
*G03G 15/20* (2006.01)

(52) U.S. Cl.
CPC ....... *G03G 15/2053* (2013.01); *G03G 15/206* (2013.01); *G03G 15/2064* (2013.01); *G03G 2215/2025* (2013.01)

(58) Field of Classification Search
None
See application file for complete search history.

(56) References Cited

U.S. PATENT DOCUMENTS 5,732,318 A * 3/1998 Natsuhara .............. H05B 3/141 399/329
2014/0186077 A1* 7/2014 Lee .................... G03G 15/2053 399/329
2015/0139706 A1 5/2015 Fujiwara et al.
2015/0338795 A1* 11/2015 Yamaguchi ............ H05B 6/107 219/216
2015/0338804 A1* 11/2015 Nakashima ............ H05B 3/141 219/216
2020/0004183 A1* 1/2020 Yabuki ............... G03G 15/2053
2020/0033768 A1* 1/2020 Furuichi ............ G03G 15/2053
2020/0133179 A1* 4/2020 Fukamachi ........ G03G 15/2017
2020/0192259 A1* 6/2020 Morihara ........... G03G 15/2053
2020/0225607 A1* 7/2020 Imamiya ............ G03G 15/2039

FOREIGN PATENT DOCUMENTS

JP 2015-099190 A 5/2015
JP 2022029694 A * 2/2022

OTHER PUBLICATIONS

Machine translation of Sato Yutaka (2022).*

* cited by examiner

*Primary Examiner* — Sevan A Aydin
(74) *Attorney, Agent, or Firm* — Merchant & Gould P.C.

(57) ABSTRACT

A fuser includes a rotatable heating member, a heater with a first surface and a second surface, a rotatable pressing member, a heat-conductive member, and a holder with a first holder surface and a second holder surface. In a conveying direction, a dimension of the heat-conductive member is greater than a dimension of the heater. The first holder surface supports the second surface of the heater. The second holder surface is located at least either upstream or downstream of the first holder surface in the conveying direction. The second holder surface faces the heat-conductive member and is located closer than the first holder surface to the heat-conductive member in a thickness direction of the heater. The first holder surface and the second holder surface are connected by a gap surface. A thickness of the heater is greater than a length of the gap surface in the thickness direction.

22 Claims, 12 Drawing Sheets

FUSER

REFERENCE TO RELATED APPLICATIONS

This application claims priority from Japanese Patent Application No. 2023-141647, filed on Aug. 31, 2023. The entire content of the priority application is incorporated herein by reference.

BACKGROUND ART

A fuser including a film in a rolled form, a heater in a form of a board, a pressing roller, and a heat-conductive member, is known. The heater may be located inside the rolled film. The pressing roller may form a nip in conjunction with the rolled film. The heat-conductive member may be located between an inner circumferential surface of the film and the heater.

SUMMARY

The part of the rolled film forming the nip may not be heated effectively when the heater is not in steady contact with the heat-conductive member.

The present disclosure relates to a fuser, in which contact between a heater and a heat-conductive member is secured.

According to an aspect of the present disclosure, a fuser includes a rotatable heating member, a heater, a rotatable pressing member, a heat-conductive member, and a holder. The rotatable heating member is in a form of a roll. The heater is in a form of a board and is located inside the rotatable heating member. The heater has a first surface and a second surface opposite to the first surface in a thickness direction of the heater. The rotatable pressing member forms a nip in conjunction with the rotatable heating member. The rotatable pressing member is configured to convey a sheet in a conveying direction in conjunction with the rotatable heating member. The conveying direction intersects orthogonally with a lengthwise direction of the heater and with the thickness direction of the heater. The heat-conductive member is located between an inner circumferential surface of the rotatable heating member and the first surface of the heater in the thickness direction. The heat-conductive member nips the rotatable heating member in conjunction with the rotatable pressing member. The holder is located inside the rotatable heating member and supports the heater. A dimension of the heat-conductive member in the conveying direction is greater than a dimension of the heater in the conveying direction. The holder includes a first holder surface and a second holder surface. The first holder surface supports the second surface of the heater. The second holder surface is located at least either upstream or downstream of the first holder surface in the conveying direction. The second holder surface faces the heat-conductive member. The second holder surface is located closer than the first holder surface to the heat-conductive member in the thickness direction. The first holder surface and the second holder surface are connected by a gap surface. A thickness of the heater is greater than a length of the gap surface in the thickness direction.

DESCRIPTION

An embodiment of the present disclosure will be described below.

Figure 1:
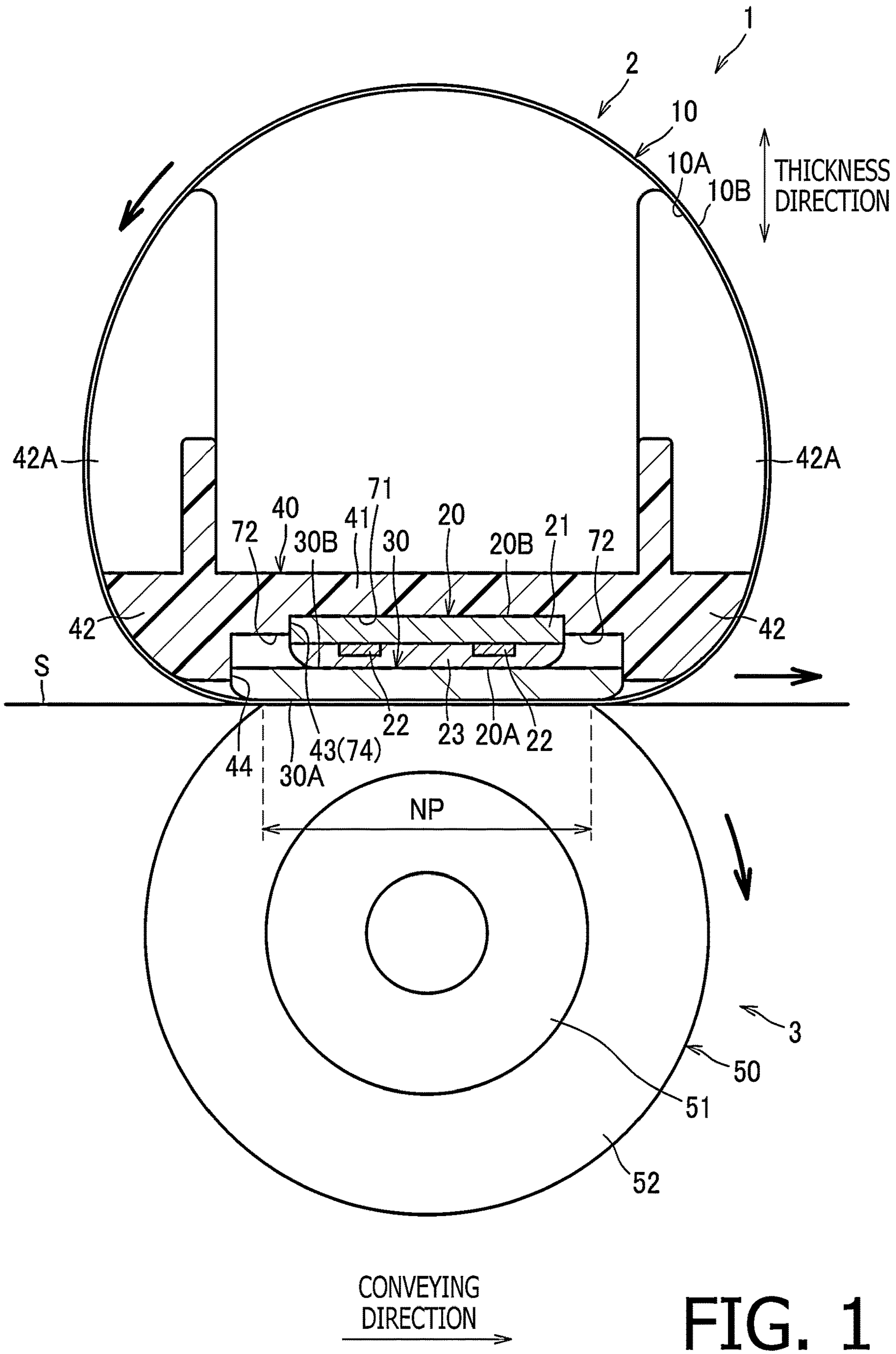
FIG. 1 is a cross-sectional view of a fuser viewed along a lengthwise direction of a heater.

As shown in FIG. 1, a fuser 1 is a fixing device that may be employed in, for example, an electro-photographical image forming apparatus or, for another example, a foil-transfer printer that may thermally transfer pieces of foil onto a printing medium. The fuser 1 includes a heating unit 2 and a pressing unit 3.

The fuser 1 employed in, for example, the image forming apparatus may fix an image formed in toner onto a sheet S, such as paper sheet, as the sheet S is conveyed through a position between the heating unit 2 and the pressing unit 3. The fuser 1 employed in, for another example, the foil-transfer printer may transfer the foil pieces onto a sheet S as the sheet S is conveyed through the position between the heating unit 2 and the pressing unit 3.

The heating unit 2 includes a belt 10 being a roll of rotatable heating member, a heater 20, a heat-conductive board 30 being a heat-conductive member, and a holder 40. The pressing unit 3 includes a pressing roller 50 being a rotatable presser body.

The belt 10 is a roll of belt configured to rotate around the heater 20. The belt 10 has an inner circumferential surface 10A and an outer circumferential surface 10B. The inner circumferential surface 10A of the belt 10 is in contact with the heat-conductive board 30, and the outer circumferential surface 10B of the belt 10 is in contact with the pressing roller 50. Moreover, the outer circumferential surface 10B of the belt 10 may contact the sheet S being conveyed through the position between the heating unit 2 and the pressing unit 3.

The heater 20 is in a form of a bar and may heat the sheet S being conveyed through the position between the heating unit 2 and the pressing unit 3. The heater 20 is located on an inner side of the rolled belt 10. The heater 20 has a first surface 20A and a second surface 20B. The first surface 20A is a surface, through which the heater 20 is in contact with the heat-conductive board 30. The second surface 20B is on a side opposite to the first surface 20A in a direction of thickness of the heater 20.

The pressing roller 50 forms a nip NP in conjunction with the belt 10. The pressing roller 50 may convey the sheet S in a predetermined conveying direction in the area between the pressing roller 50 and the belt 10 by rotating. The conveying direction intersects orthogonally with a lengthwise direction of the heater 20 (see FIG. 2) and with the direction of thickness of the heater 20. In the description below, the lengthwise direction of the heater 20 and the direction of thickness of the heater 20 will simply be called "lengthwise direction" and "thickness direction," respectively.

The pressing roller 50 includes a shaft 51 and a roller body 52. The shaft 51 may be made of, for example, metal. The roller body 52 may be made of, for example, rubber, and covers a circumference of the shaft 51. One of the heating unit 2 and the pressing unit 3 in the fuser 1 is urged against the other of the heating unit 2 and the pressing unit 3. As such, the nip NP is formed between the belt 10 and the pressing roller 50. In other words, the nip NP is formed of a portion of the belt 10 and a portion of the pressing roller 50 that are in contact with each other.

The heat-conductive board 30 may conduct heat from the heater 20 in the lengthwise direction and the conveying direction to equalize the temperature in the nip NP in the lengthwise direction and the conveying direction. The heat-conductive board 30 is in a form of a bar. The heat-conductive board 30 is located between the inner circumferential surface 10A of the belt 10 and the first surface 20A of the heater 20 in the thickness direction. The heat-conductive board 30 nips the belt 10 in conjunction with the pressing roller 50.

The heat-conductive board 30 includes a first contact surface 30A and a second contact surface 30B. The first contact surface 30A is the surface to contact the inner circumferential surface 10A of the belt 10. The second contact surface 30B is the surface to contact the first surface 20A of the heater 20.

The holder 40 supports the heater 20. In particular, the holder 40 supports the second surface 20B of the heater 20. The holder 40 is located on the inner side of the belt 10. The holder 40 may be made of resin. The holder 40 includes a supporting base 41 and a guide 42.

The supporting base 41 includes a first locator groove 43 and a second locator groove 44. In the first locator groove 43, the heater 20 is located. In the second locator groove 44, the heat-conductive board 30 is located. The first locator groove 43 and the second locator groove 44 extend in the lengthwise direction.

The second locator groove 44 is deepened in a direction to separate from the pressing roller 50 along the thickness direction. The first locator groove 43 is deepened from a deepened end of the second locator groove 44 in a direction to separate from the pressing roller 50 along the thickness direction. The holder 40 supports the second surface 20B of the heater 20 at a deepened end of the first locator groove 43 in the supporting base 41.

The guide 42 is formed on one side and the other side of the supporting base 41 in the conveying direction. The guide 42 includes a guide rib 42A. A plurality of guides 42 and a plurality of guide ribs 42A may be provided on each side of the supporting base 41 along the lengthwise direction. Each guide rib 42A has a form to curve along the inner circumferential surface 10A of the belt 10. The inner circumferential surface 10A of the belt 10 is in contact with the guides 42. The belt 10 being guided by the guides 42 may roll around the heater 20.

Figure 2:
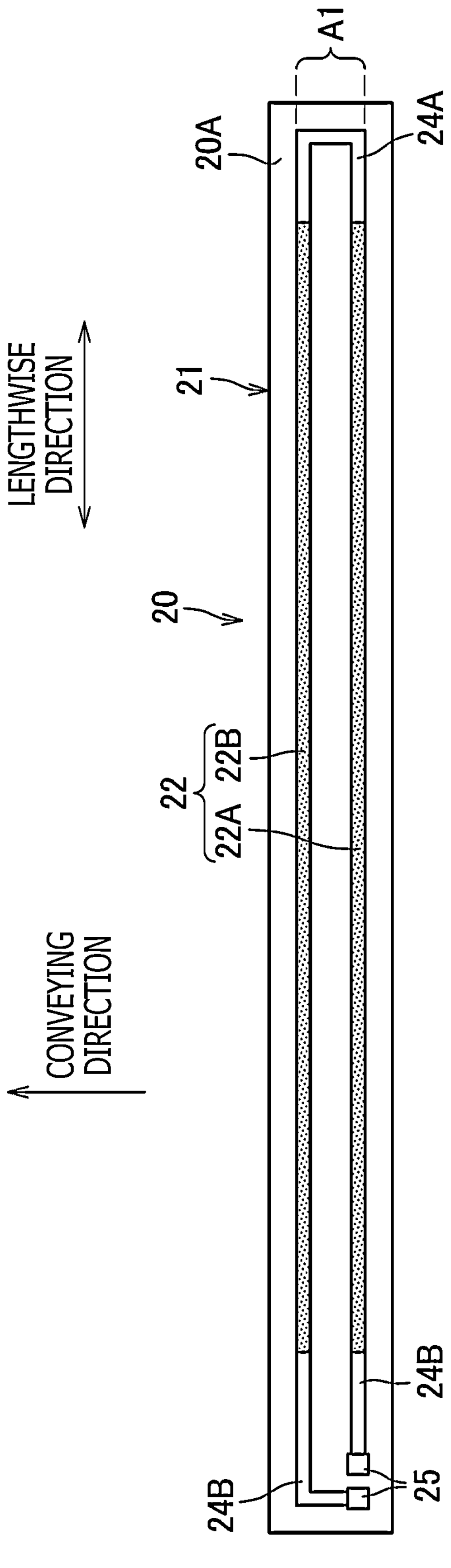
FIG. 2 is a plan view of a first surface of the heater.

The heater 20 includes a base board 21, a resistance heating element 22, and a cover 23. As shown in FIG. 2, the base board 21 is a rectangular bar extending in the lengthwise direction. The base board 21 may be made of ceramic, and the heater 20 may be a so-called ceramic heater.

The resistance heating element 22 is supported by the base board 21. The resistance heating element 22 is arranged on the first surface 20A of the heater 20. The resistance heating element 22 is formed in printing. The resistance heating element 22 includes a first resistance heating element 22A and a second resistance heating element 22B. The first resistance heating element 22A and the second resistance heating element 22B extend in the lengthwise direction.

The first resistance heating element 22A and the second resistance heating element 22B are located apart from each other in the conveying direction and extend in parallel to each other. The first resistance heating element 22A is located on one end of a region A1, in which the resistance heating element 22 ranges in the conveying direction, and the second resistance heating element 22B is located on the other end of the region A1 in the conveying direction.

The first resistance heating element 22A and the second resistance heating element 22B are connected to each other through a conductive wire 24A connected at ends thereof on one side in the lengthwise direction. To each of the other ends of the first resistance heating element 22A and the second resistance heating element 22B in the lengthwise direction, a conductive wire 24B is connected. Each of the conductive wires 24B has a power-supply terminal 25 on one end thereof. The power-supply terminals 25 are electrically connected to the resistance heating element 22 through the conductive wires 24B. The power-supply terminals 25 are connected to a connector 60 (see FIG. 4), from which power to the resistance heating element 22 is supplied.

Figure 3:
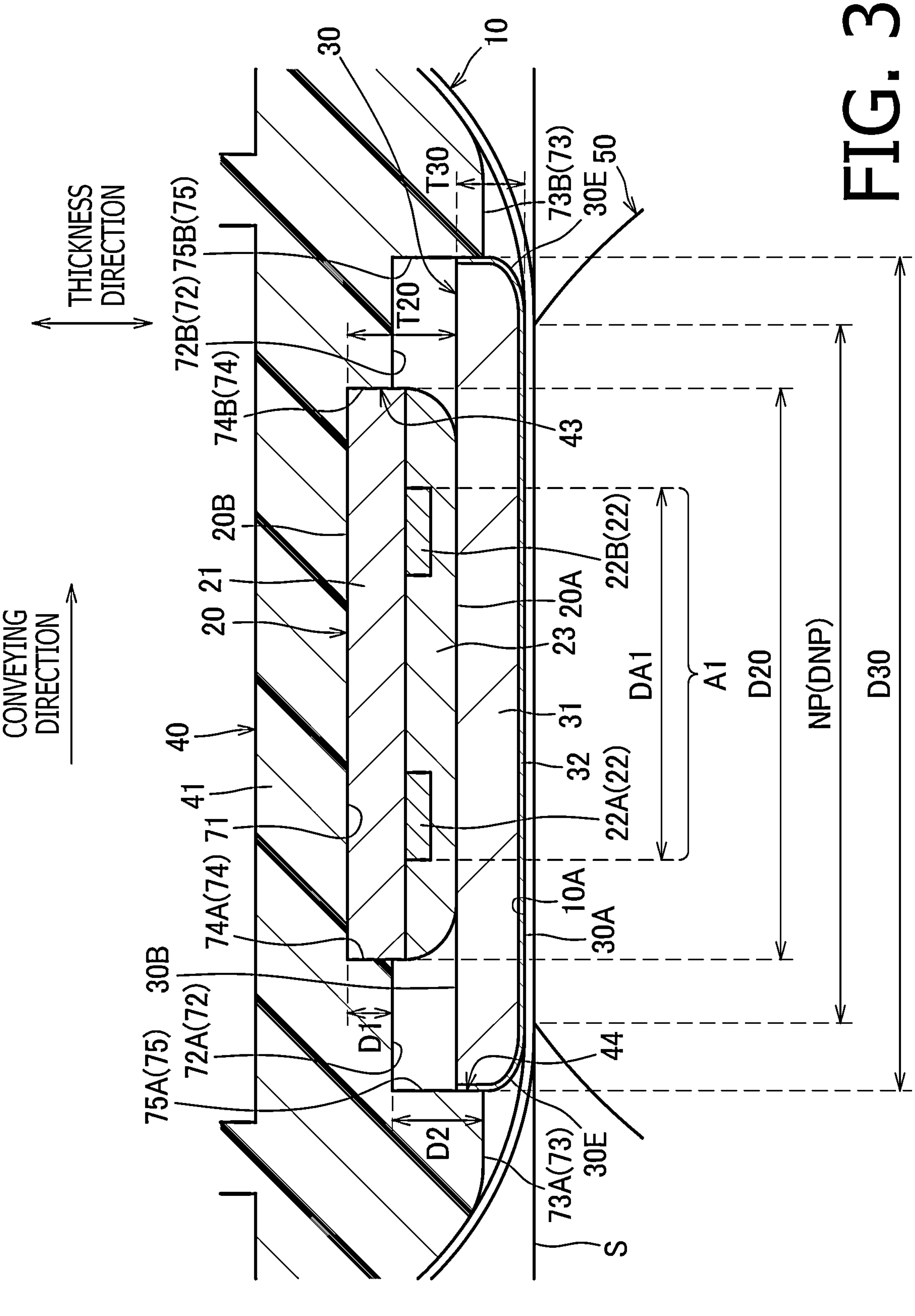
FIG. 3 is an enlarged cross-sectional view of a holder in the fuser.

As shown in FIG. 3, the cover 23 covers the resistance heating element 22. The cover 23 may be made of, for example, glass.

The heat-conductive board 30 includes a base 31 and a coating layer 32. The base 31 has higher heat conductivity than the base board 21. A material of the base 31 is not necessarily limited but may be, for example, a metal with high heat-conductivity such as aluminum, aluminum alloy, and copper.

The coating layer 32 is in contact with the inner circumferential surface 10A of the belt 10. The coating layer 32 covers at least a part of a surface of the base 31. The coating layer 32 may cover, for example, among the surfaces of the base 31, a surface on one side toward the pressing roller 50 in the thickness direction, side surfaces on one side and the other side in the conveying direction, and side surfaces on one side and the other side in the lengthwise direction. Optionally, the coating layer 32 may cover the entire surfaces of the base 31.

The coating layer 32 is made of a material, of which sliding properties are higher than those of the base 31. The material of the coating layer 32 may include, for example, nickel phosphorous (NiP), chromium nitride (CrN), titanium nitride (TiN), titanium aluminum nitride (TiAlN), intrinsic carbon film (ICF), diamond-like carbon (DLC). In other words, the coating layer 32 may be, for example, an electroless nickel plating layer, a CrN-coating layer, a TiN-coating layer, a TiAlN-coating layer, an ICF-coating layer, a DLC-coating layer.

The heat-conductive board 30 includes edges 30E. The edges 30E is contactable with the inner circumferential surface 10A of the belt 10. The edges 30E of the heat-conductive board 30 on an upstream side and a downstream side in the conveying direction may be rounded. In particular, the edges 30E may have curved cross-sectional shapes. A curvature radius of the edges 30E may be, for example, 0.3 mm or greater.

The holder 40 includes a first holder surface 71, a second holder surface 72, and a third holder surface 73. The first holder surface 71 is a surface of the deepened end of the first locator groove 43. The first holder surface 71 supports the second surface 20B of the heater 20.

The second holder surface 72 is a surface of the deepened end of the second locator groove 44. The second holder surface 72 faces the second contact surface 30B of the heat-conductive board 30 in the thickness direction. The second holder surface 72 is located on an upstream side and a downstream side of the first holder surface 71 in the conveying direction. The second holder surface 72 is located closer than the first holder surface 71 to the heat-conductive board 30 in the thickness direction.

The second holder surface 72 includes an upstream second holder surface 72A and a downstream second holder surface 72B. The upstream second holder surface 72A is the second holder surface 72 located on an upstream side of the first holder surface 71 in the conveying direction. The downstream second holder surface 72B is the second holder surface 72 located on a downstream side of the first holder surface 71 in the conveying direction.

Between the second holder surface 72 and the first holder surface 71, a first gap 74 is formed. The first gap 74 includes a gap surface formed between the first holder surface 71 and the second holder surface 72 and connecting the first holder surface 71 and the second holder surface 72. The gap surface of the first gap 74 includes an upstream first gap surface 74A and a downstream first gap surface 74B. The upstream first gap surface 74A is formed between the first holder surface 71 and the upstream second holder surface 72A. The downstream first gap surface 74B is formed between the first holder surface 71 and the downstream second holder surface 72B.

A thickness T20 of the heater 20 is greater than the first gap 74. In particular, the thickness T20 of the heater 20 is greater than a dimension D1 of the first gap 74 in the thickness direction. More specifically, the thickness T20 of the heater 20 is greater than a dimension D1 of the upstream first gap surface 74A in the thickness direction, and the thickness T20 of the heater 20 is greater than a dimension D1 of the downstream first gap surface 74B in the thickness direction. In other words, the thickness T20 of the heater 20 is greater than a depth D1 of the first locator groove 43.

The heater 20 is fitted in the first locator groove 43. The first locator groove 43 is a recess defined by the first holder surface 71, the upstream first gap surface 74A, and the downstream first gap surface 74B. The heater 20 is fitted between the upstream first gap surface 74A and the downstream first gap surface 74B. The heater 20 is in contact with the first holder surface 71 by the second surface 20B and is supported by the first holder surface 71.

The third holder surface 73 faces the inner circumferential surface 10F of the belt 10 in the thickness direction. The third holder surface 73 includes an upstream third holder surface 73A and a downstream third holder surface 73B. The upstream third holder surface 73A is located on one side of the second holder surface 72 in the conveying direction opposite to the side, on which the first holder surface 71 is located. In particular, the upstream third holder surface 73A is located upstream of the upstream second holder surface 72A in the conveying direction.

The downstream third holder surface 73B is located on one side of the second holder surface 72 in the conveying direction opposite to the side, on which the first holder surface 71 is located. In particular, the downstream third holder surface 73B is located downstream of the downstream second holder surface 72B in the conveying direction.

Between the second holder surface 72 and the third holder surface 73, a second gap 75 is formed. The second gap 75 includes a gap surface formed between the second holder surface 72 and the third holder surface 73 and connecting the second holder surface 72 and the third holder surface 73. The second gap 75 includes an upstream second gap 75A and a downstream second gap 75B. The upstream second gap 75A is the second gap 75 formed between the upstream second holder surface 72A and the upstream third holder surface 73A. The downstream second gap 75B is the second gap 75 formed between the downstream second holder surface 72B and the downstream third holder surface 73B.

The heat-conductive board 30 is fitted in the second locator groove 44. The second locator groove 44 is formed of the second holder surface 72, the upstream second gap 75A, and the downstream second gap 75B. The heat-conductive board 30 is fitted between the gap surface of the upstream second gap 75A and the gap surface of the downstream second gap 75B. In other words, the heat-conductive board 30 is fitted between an upstream one of the side surfaces of the second locator groove 44 and a downstream one of the side surfaces of the second locator groove 44 in the conveying direction.

According to the present embodiment, the heat-conductive board 30 is generally separated from the second holder surface 72 being the deepened end of the second locator groove 44. However, there may be a case that ends of the heat-conductive board 30 in the conveying direction may bow in a direction toward the second holder surface 72 along the thickness direction and contact the second holder surface 72. In the case where the heat-conductive board 30 contacts the second holder surface 72, the second holder surface 72 may support the heat-conductive board 30 on the second contact surface 30B.

The heat-conductive board 30 protrudes toward the pressing roller 50 in the thickness direction beyond the third holder surface 73. In particular, a sum of the thickness T20 of the heater 20 and a thickness T30 of the heat-conductive board 30 is greater than a sum of the dimension D1 of the first gap 74 in the thickness direction and a dimension D2 of the second gap 75 in the thickness direction. In other words, the sum of the thickness T20 of the heater 20 and the thickness T30 of the heat-conductive board 30 is greater than a sum of the depth D1 of the first locator groove 43 and a depth D2 of the second locator groove 44.

A dimension D30 of the heat-conductive board 30 in the conveying direction is greater than a dimension D20 of the heater 20 in the conveying direction. In the conveying direction, an upstream end of the heat-conductive board 30 is located upstream of an upstream end of the heater 20. In the conveying direction, a downstream end of the heat-conductive board 30 is located downstream of a downstream end of the heater 20.

The dimension D30 of the heat-conductive board 30 in the conveying direction is greater than a dimension DNP of the nip NP in the conveying direction. In the conveying direction, the upstream end of the heat-conductive board 30 is located upstream of an upstream end of the nip NP. In the conveying direction, the downstream end of the heat-conductive board 30 is located downstream of a downstream end of the nip NP.

The dimension DNP of the nip NP in the conveying direction is greater than a dimension DA1 of the region A1, in which the resistance heating element 22 ranges, in the conveying direction. In the conveying direction, the upstream end of the nip NP is located upstream of an upstream end of the region A1, in which the resistance heating element 22 ranges. In the conveying direction, the downstream end of the nip NP is located downstream of a downstream end of the region A1, in which the resistance heating element 22 ranges.

Figure 4:
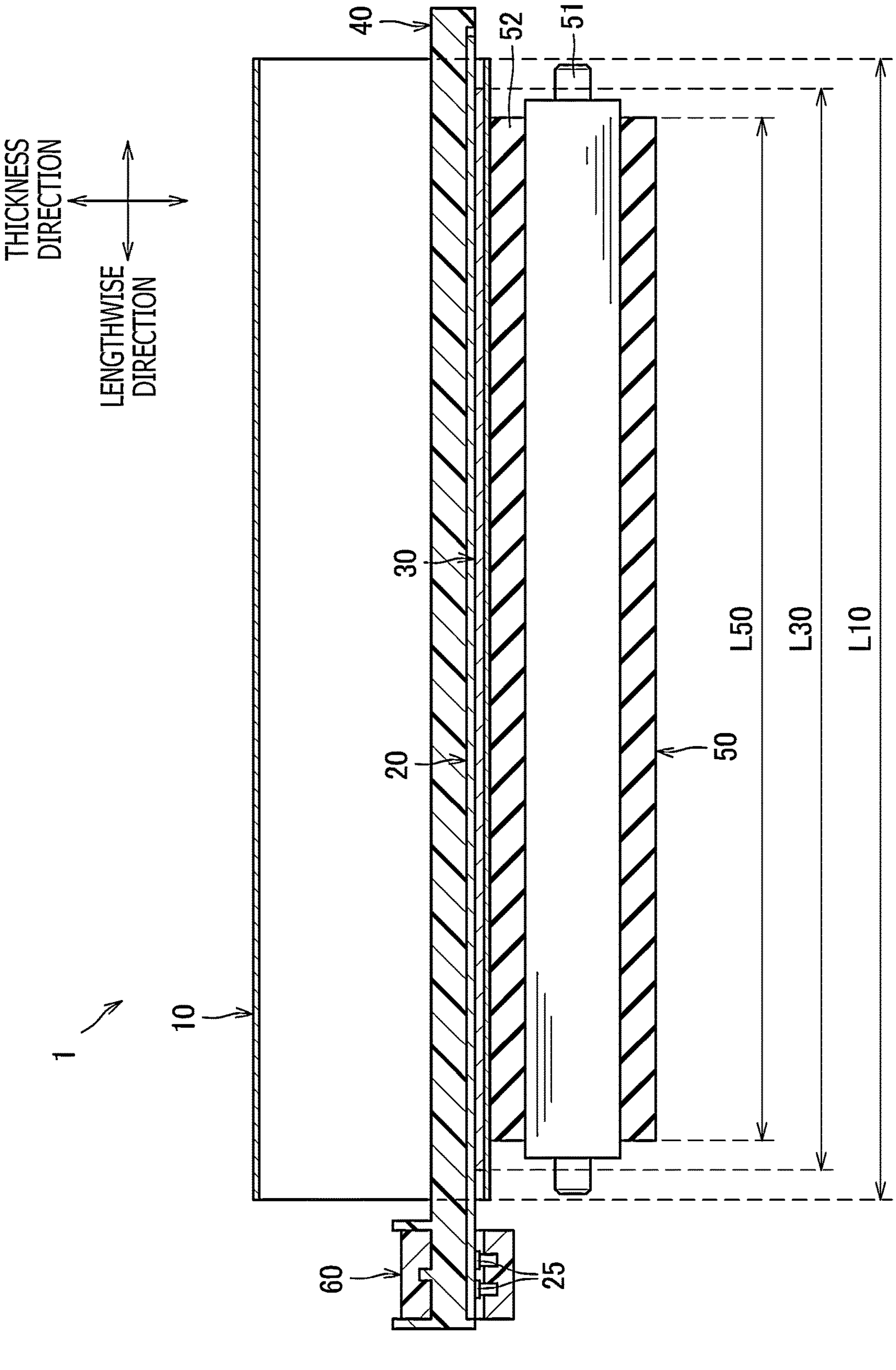
FIG. 4 is a cross-sectional view of the fuser viewed along a conveying direction.

As shown in FIG. 4, a dimension L30 of the heat-conductive board 30 in the lengthwise direction is greater than a dimension L50 of the pressing roller 50 in the lengthwise direction. In the lengthwise direction, one end of the heat-conductive board 30 is located farther from a center of the pressing roller 50 than one end of the pressing roller 50. In the lengthwise direction, the other end of the heat-conductive board 30 is located farther from the center of the pressing roller 50 than the other end of the pressing roller 50.

In particular, the dimension L50 is a dimension of the roller body 52 of the pressing roller 50 in the lengthwise direction. In the lengthwise direction, the one end of the heat-conductive board 30 is located farther from the center of the pressing roller 50 than one end of the roller body 52. In the lengthwise direction, the other end of the heat-conductive board 30 is located farther from the center of the pressing roller 50 than the other end of the roller body 52.

According to the present embodiment, in the lengthwise direction, the one end of the heat-conductive board 30 is located farther from the center of the roller body 52 than the one end of the roller body 52, and in the lengthwise direction, the other end of the heat-conductive board 30 is located farther from the center of the roller body 52 than the other end of the roller body 52.

A dimension L10 of the belt 10 in the lengthwise direction is greater than the dimension L30 of the heat-conductive board 30 in the lengthwise direction. In the lengthwise direction, one end of the belt 10 is located farther from the center of the heat-conductive board 30 than the one end of the heat-conductive board 30. In the lengthwise direction, the other end of the belt 10 is located farther from the center of the heat-conductive board 30 than the other end of the heat-conductive board 30.

In the lengthwise direction, the one end of the heat-conductive board 30 is located between the one end of the belt 10 and the one end of the roller body 52 of the pressing roller 50. In the lengthwise direction, the other end of the heat-conductive board 30 is located between the other end of the belt 10 and the other end of the roller body 52 of the pressing roller 50.

Next, effects that may be caused by the fuser 1 according to the present embodiment will be described below.

The thickness T20 of the heater 20 is greater than the first gap 74 formed between the first holder surface 71 and the second holder surface 72; therefore, the heater 20 protrudes beyond the second holder surface 72 toward the heat-conductive board 30, and the heat-conductive board 30 may be securely in contact with the heater 20. Accordingly, the nip NP may be heated effectively.

The heater 20 is fitted in the first locator groove 43, which is formed of the first holder surface 71, the upstream first gap surface 74A, and the downstream first gap surface 74B. Therefore, the position of the heater 20 in the conveying direction may be stably maintained.

The heat-conductive board 30 protrudes in the thickness direction beyond the third holder surface 73 toward the pressing roller 50; therefore, an area in which the belt 10 and the third holder surface 73 contact each other may be reduced. According to the present embodiment, the belt 10 may not contact the third holder surface 73 in the regular condition. Therefore, the heat transmitted from the heat-conductive board 30 to the belt 10 may be prevented from dissipating in the holder 40 through the third holder surface 73. Accordingly, the belt 10, more specifically, the nip NP, may be heated efficiently.

In the conveying direction, the upstream end of the heat-conductive board 30 is located upstream with respect to the upstream end of the heater 20, and the downstream end of the heat-conductive board 30 is located downstream with respect to the downstream end of the heater 20. Therefore, the edges of the heater 20 on the ends in the conveying direction may be prevented from contacting the belt 10. Moreover, an area in which the heat-conductive board 30 heated by the heater 20 contacts the belt 10 may be increased. Therefore, the belt 10 may be heated efficiently. Moreover, an area of the nip NP may be increased.

In the conveying direction, the upstream end of the heat-conductive board 30 is located upstream with respect to the upstream end of the nip NP, and the downstream end of the heat-conductive board 30 is located downstream with respect to the downstream end of the nip NP. Therefore, the belt 10 may be prevented from being urged against the edges 30E of the heat-conductive board 30 by the pressing roller 50 at the ends of the nip NP in the conveying direction, and abrasion of the belt 10 may be reduced or moderated.

In the conveying direction, the region A1, in which the resistance heating element 22 ranges, is located within the nip NP. Therefore, compared to an arrangement such that the region in which the resistance heating element ranges is extended to the outside of the nip, the heater 20 may heat the nip NP efficiently. In other words, the heater 20 may not heat parts of the belt 10 on the upstream side and the downstream side of the nip NP in the conveying direction wastefully.

The edges 30E of the heat-conductive board 30 are rounded; therefore, abrasion of the belt 10 may be reduced or moderated.

In the lengthwise direction, the one end of the heat-conductive board 30 is located farther from the center of the roller body 52 than the one end of the roller body 52 of the pressing roller 50, and the other end of the heat-conductive board 30 is located farther from the center of the roller body 52 than the other end of the roller body 52 of the pressing roller 50. Therefore, the pressing roller 50, more specifically, the roller body 52, may be prevented from being urged against the edges 30E of the heat-conductive board 30 on the ends in the lengthwise direction. Accordingly, abrasion of the pressing roller 50, or the roller body 52, may be reduced or moderated.

In the lengthwise direction, the one end of the heat-conductive board 30 is located between the one end of the belt 10 and the one end of the roller body 52, and the other end of the heat-conductive board 30 is located between the other end of the belt 10 and the other end of the roller body 52. Therefore, the belt 10 is not nipped between the edge 30E of the heat-conductive board 30 and the pressing roller 50. Accordingly, abrasion of the belt 10 may be reduced or moderated.

The coating layer 32 of the heat-conductive board 30, which is in contact with the inner circumferential surface 10A of the belt 10, is made of a material having higher slidable properties than the base 31. Therefore, abrasion of the belt 10 may be reduced or moderated. Further, the belt 10 may be prevented from slipping between the heat-conductive board 30 and the pressing roller 50.

While the invention has been described in conjunction with an example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

Modified examples of the present disclosure will be described below. In the following paragraphs, parts and items that are substantially similar or identical to those in the fuser 1 described above will be referred to by the same reference sings, and detailed description of those will be herein omitted.

Figure 5A:
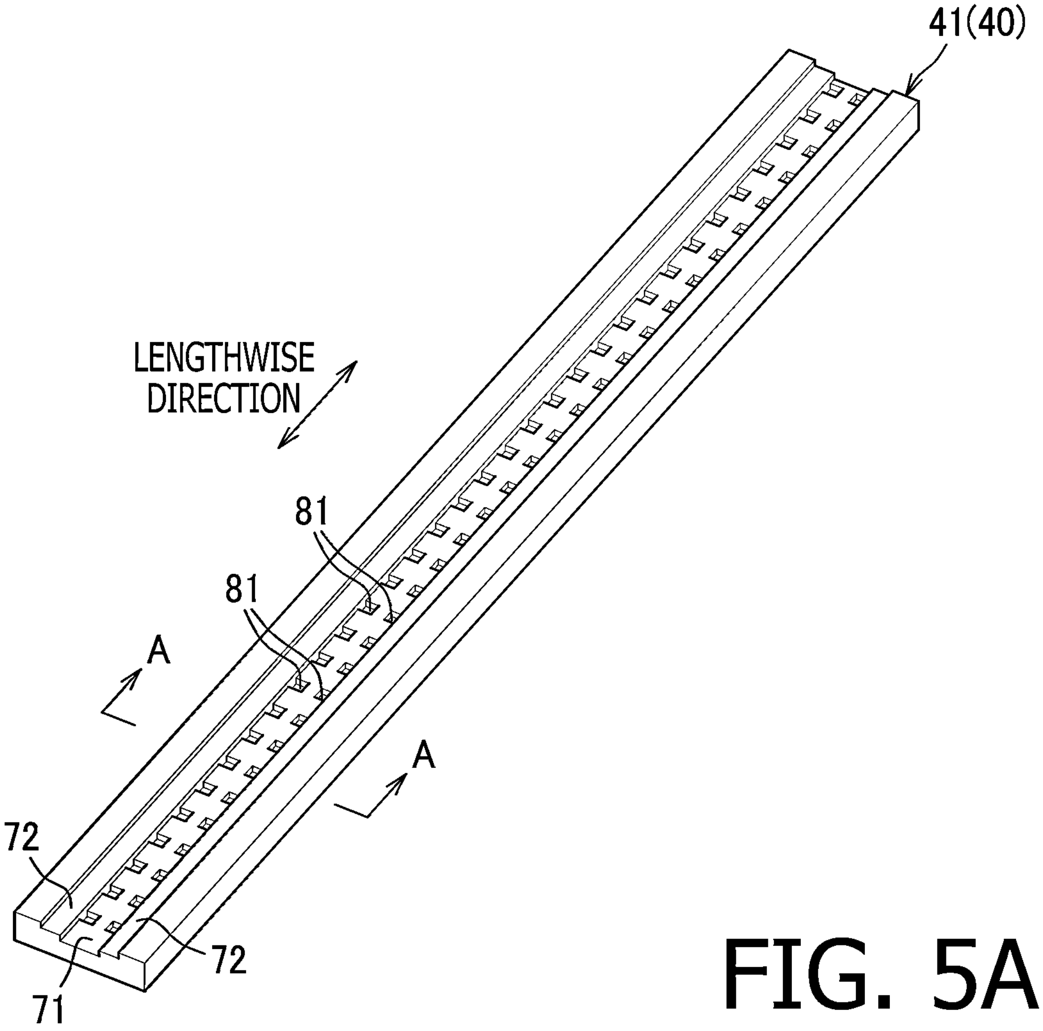
FIG. 5A is a perspective view of another holder in a fuser.
Figure 5B:
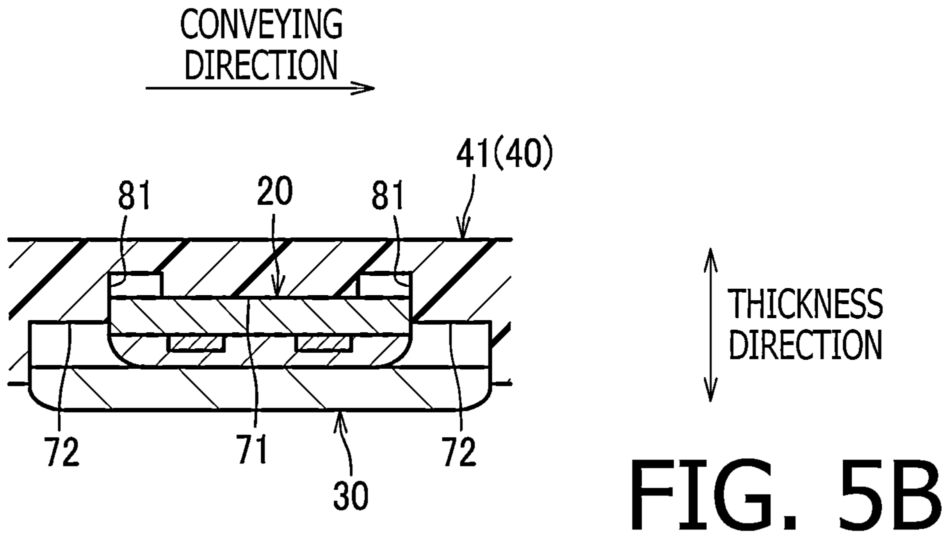
FIG. 5B is a cross-sectional view of the holder sectioned at a line A-A in FIG. 5A.

For example, as shown in FIGS. 5A-5B illustrating a first modified example, the holder 40 may have a plurality of first recesses 81 on the first holder surface 71 of the supporting base 41. The first recesses 81 are deepened in the direction to be farther from the heater 20 along the thickness direction. The first recesses 81 are aligned in line along the lengthwise direction. In particular, in the first modified example, a line of first recesses 81 aligned in the lengthwise direction is formed on one end and the other end of the first holder surface 71 in the conveying direction.

Positions of the first recesses 81 formed on the one end of the first holder surface 71 in the conveying direction and positions of the first recesses 81 formed on the other end of the first holder surface 71 in the conveying direction overlap in the lengthwise direction. In other words, the first recesses 81 formed on the one end of the first holder surface 71 in the conveying direction and the first recesses 81 formed on the other end of the first holder surface 71 in the conveying direction are located at the same positions in the lengthwise direction. Each of the first recesses 81 formed on the one end of the first holder surface 71 in the conveying direction aligns in the conveying direction with one of the first recesses 81 formed on the other end of the first holder surface 71 in the conveying direction. The first recesses 81 formed on the one end of the first holder surface 71 in the conveying direction and the first recesses 81 formed on the other end of the first holder surface 71 in the conveying direction are formed symmetrically about a center of the first holder surface 71 in the conveying direction.

Figure 6A:
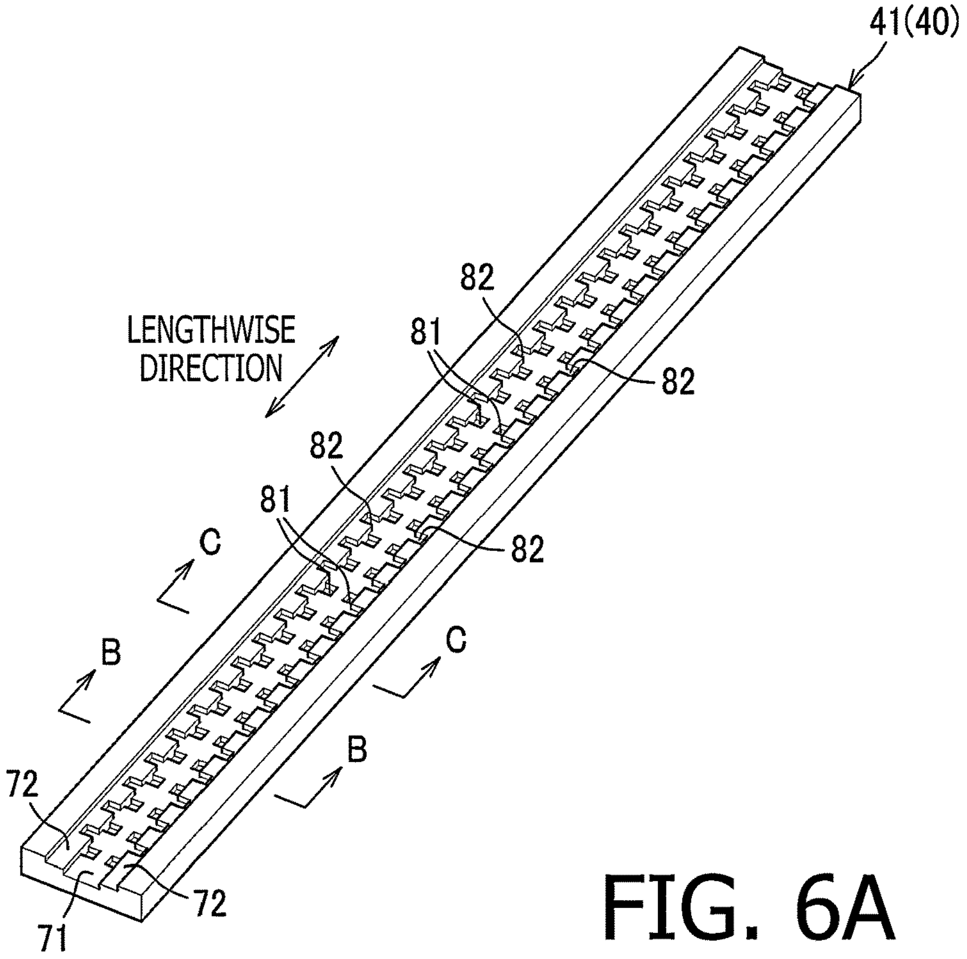
FIG. 6A is a perspective view of another holder in a fuser.
Figure 6B:
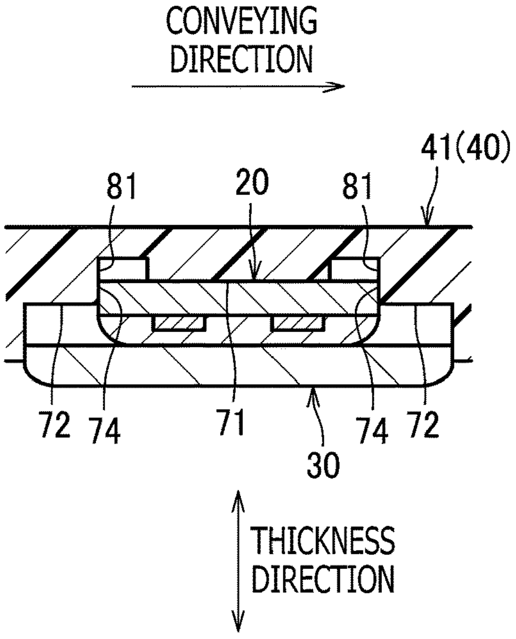
FIG. 6B is a cross-sectional view of the holder sectioned at a line B-B in FIG. 6A.
Figure 6C:
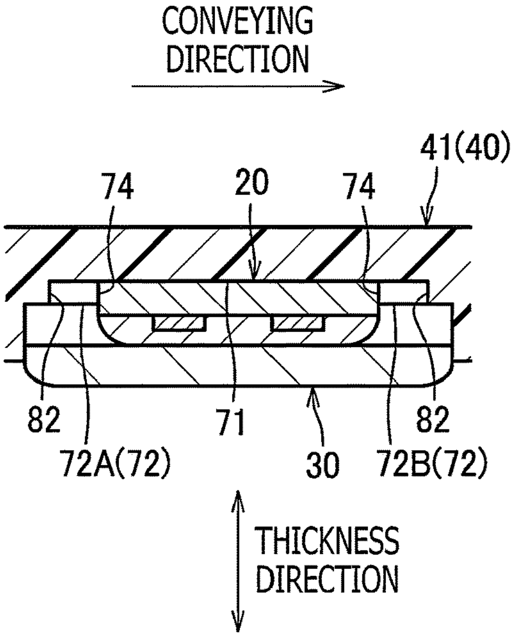
FIG. 6C is a cross-sectional view of the holder sectioned at a line C-C in FIG. 6A.

For another example, as shown in FIGS. 6A-6C illustrating a second modified example, the holder 40 may further have a plurality of second recesses 82 on the second holder surface 72 of the supporting base 41. The second recesses 82 are deepened in the direction to be farther from the heat-conductive board 30 along the thickness direction. The second recesses 82 are aligned in line along the lengthwise direction. In particular, in the second modified example, a line of second recesses 82 aligned in the lengthwise direction is formed on each of the upstream second holder surface 72A and the downstream second holder surface 72B.

Positions of the second recesses 82 formed on the upstream second holder surface 72A and positions of the second recesses 82 formed on the downstream second holder surface 72B overlap in the lengthwise direction. In other words, the second recesses 82 formed on the upstream second holder surface 72A and the second recesses 82 formed on the downstream second holder surface 72B are located at the same positions in the lengthwise direction. Each of the second recesses 82 formed on the upstream second holder surface 72A aligns in the conveying direction with one of the second recesses 82 formed on the downstream second holder surface 72B. The second recesses 82 formed on the upstream second holder surface 72A and the second recesses 82 formed on the downstream second holder surface 72B are formed symmetrically about the center of the first holder surface 71 in the conveying direction.

The first recesses 81 and the second recesses 82 are located at different positions in the lengthwise direction. In particular, each of the second recesses 82 is formed between two adjacent first recesses 81 in the lengthwise direction.

The second recesses 82 are open toward the heater 20. In other words, the second recesses 82 each have a form recessed from the surface of the first gap 74 toward upstream or downstream of the surface of the first gap 74. The second recesses 82 are recessed in a direction to be farther from the heater 20 along the conveying direction.

Figure 7A:
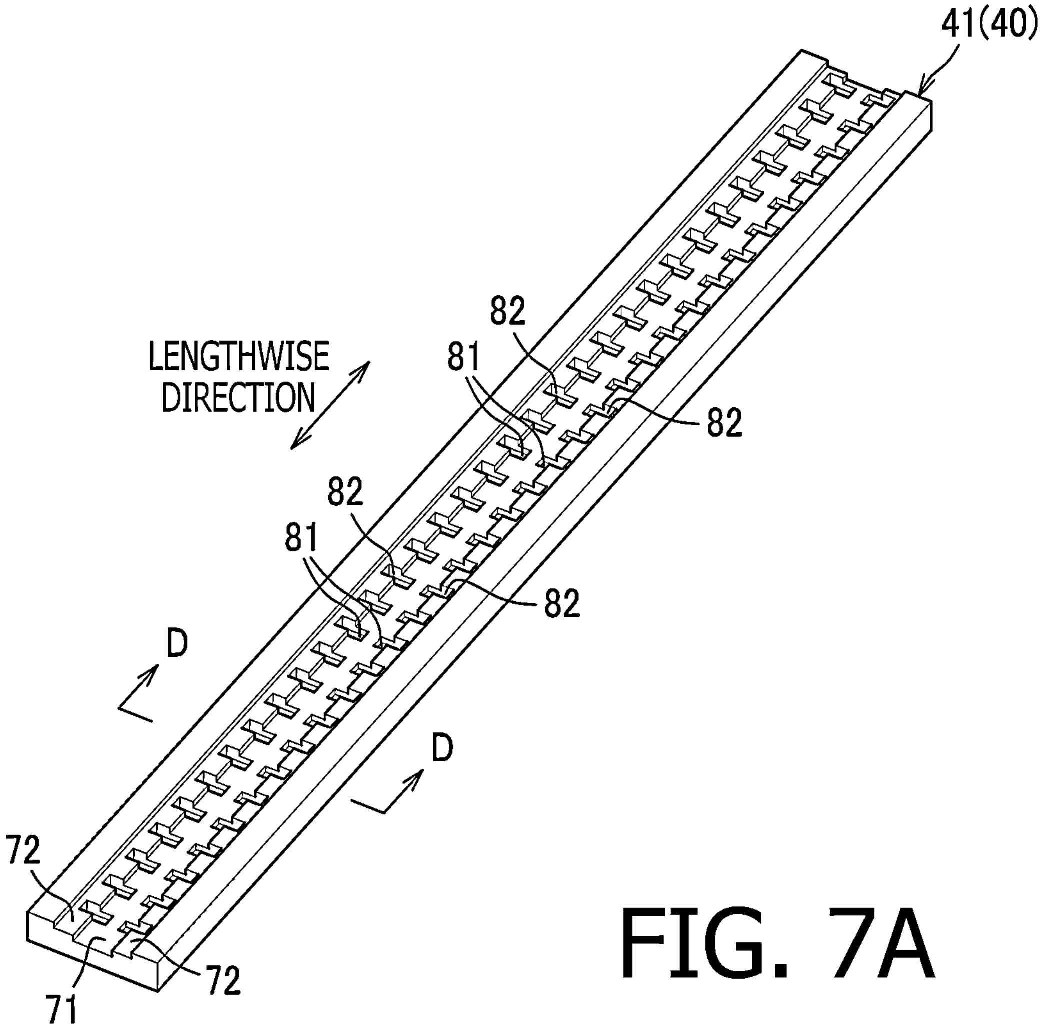
FIG. 7A is a perspective view of another holder in a fuser.
Figure 7B:
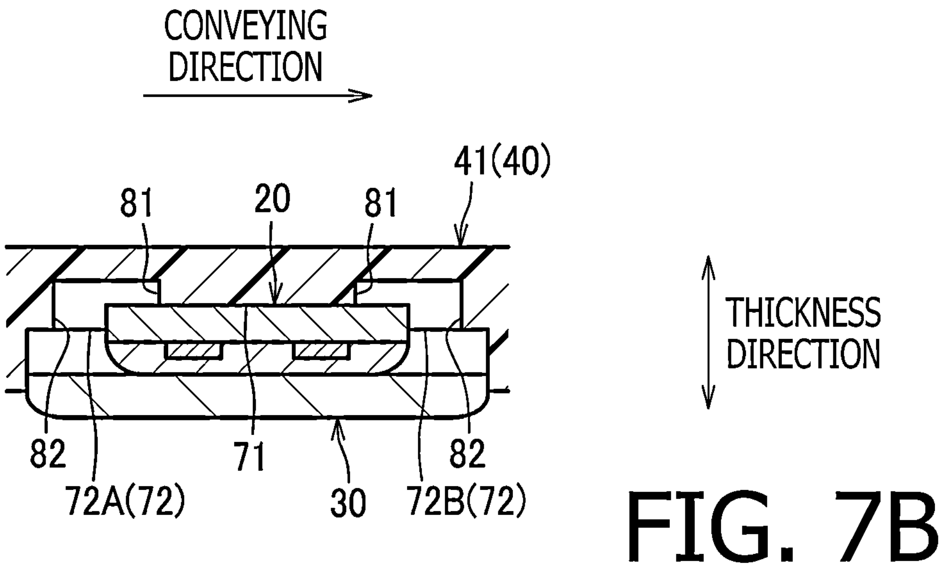
FIG. 7B is a cross-sectional view of the holder sectioned at a line D-D in FIG. 7A.

For another example, as shown in FIGS. 7A-7B illustrating a third modified example, the holder 40 may have the first recesses 81 on the first holder surface 71 and the second recesses 82 on the second holder surface 72. According to the third modified example, positions of at least one of the first recesses 81 and at least one of the second recesses 82 overlap in the lengthwise direction. In other words, at least one of the first recesses 81 and at least one of the second recesses 82 are located at the same position in the lengthwise direction.

A position of each second recess 82 and a position of two of the first recesses 81 located at the same position in the lengthwise direction overlap in the lengthwise direction. The second recesses 82 each align in the conveying direction with the two of the first recesses 81 located at the same position in the lengthwise direction. Moreover, each of the second recesses 82 formed on one of the upstream second holder surface 72A and the downstream second holder surface 72B aligns in the conveying direction with the two of the first recesses 81 located at the same position in the lengthwise direction and with one of the second recesses 82 formed on the other of the upstream second holder surface 72A and the downstream second holder surface 72B.

A dimension of each second recess 82 in the lengthwise direction is equal to a dimension of each first recess 81 in the lengthwise direction. According to the third modified example, each of the second recesses 82 may be located at a position completely coincident in the lengthwise direction with one of the first recesses 81 adjacent thereto in the conveying direction. Each of the second recesses 82 is continuous with the one of the first recesses 81 adjacent thereto in the conveying direction.

Optionally, the dimension of the second recess 82 in the lengthwise direction may be different from the dimension of the first recess 81 in the lengthwise direction. Optionally, moreover, the second recess 82 may be located at a position to partly overlap the one of the first recesses 81 adjacent thereto in the conveying direction.

Figure 8A:
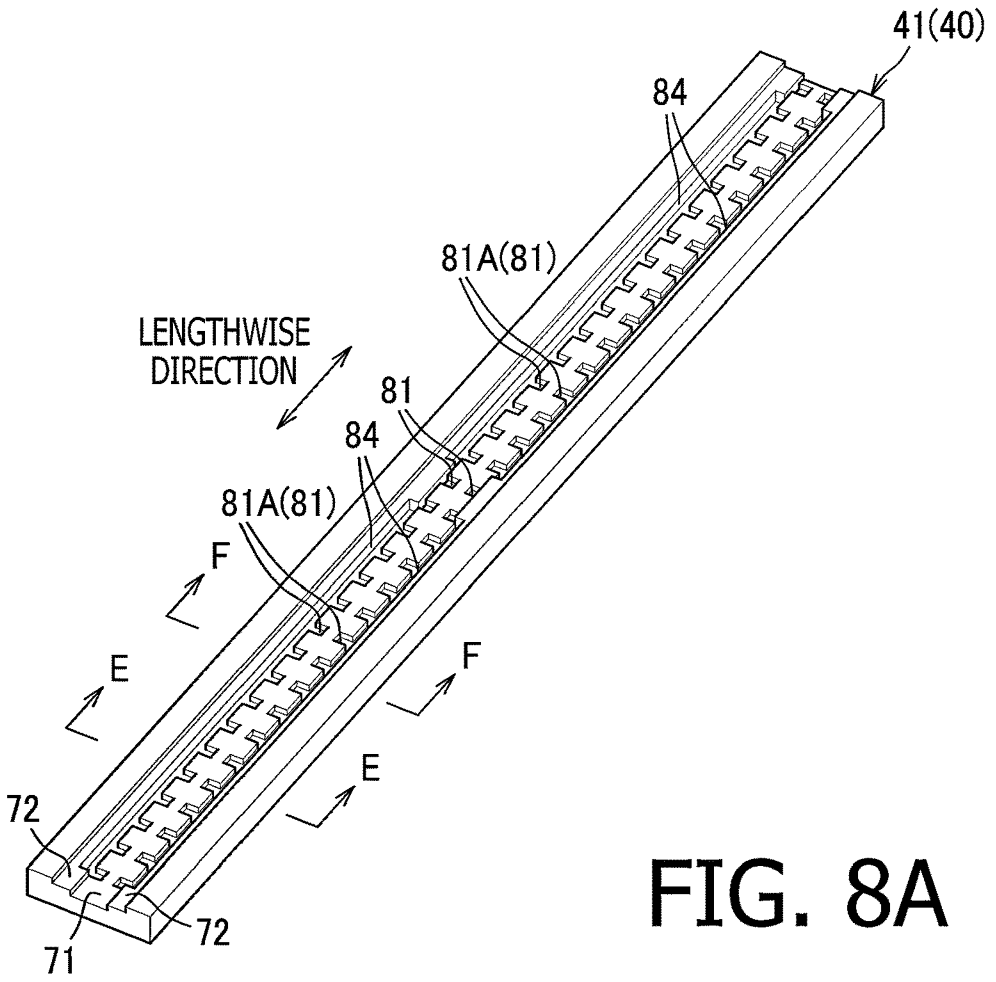
FIG. 8A is a perspective view of another holder in a fuser.
Figure 8B:
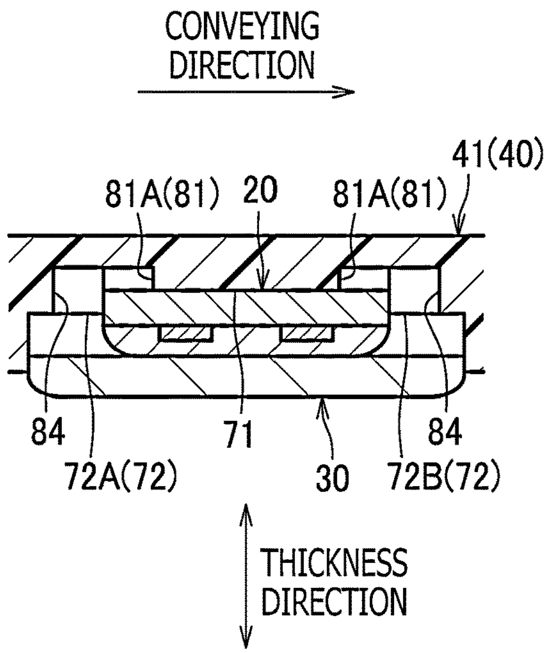
FIG. 8B is a cross-sectional view of the holder sectioned at a line E-E in FIG. 8A.
Figure 8C:
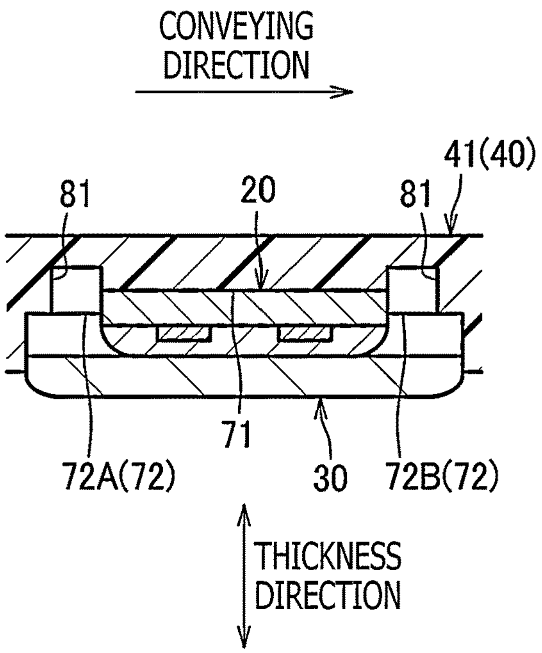
FIG. 8C is a cross-sectional view of the holder sectioned at a line F-F in FIG. 8A.

For another example, as shown in FIGS. 8A-8C illustrating a fourth modified example, the holder 40 may have a plurality of first recesses 81 on the first holder surface 71 and a plurality of second recesses 84 on the second holder surface 72. The second recesses 82 are deepened in the direction to be farther from the heater 20 along the thickness direction. The second recesses 84 are grooves extending in the lengthwise direction. According to the fourth modified example, one of two second recesses 84 is formed on the upstream second holder surface 72A, and the other of the two (2) second recesses 84 is formed on the downstream second holder surface 72B.

Position(s) of at least one of the first recesses 81 and positions of the second recesses 84 overlap in the lengthwise direction. In other words, at least one of the first recesses 81 and the second recesses 84 are located at the same position in the lengthwise direction. In the fourth modified example, the plurality of first recesses 81 aligned in the lengthwise direction include first recesses 81A, which are located at positions to overlap the second recesses 84 in the lengthwise direction. The second recesses 84 are open toward the heater 20, similarly to the second recesses 82 as shown in, for example, FIGS. 7A-7B. The first recesses 81A are each continuous with one of the second recesses 84 adjacent thereto in the conveying direction.

Figure 9A:
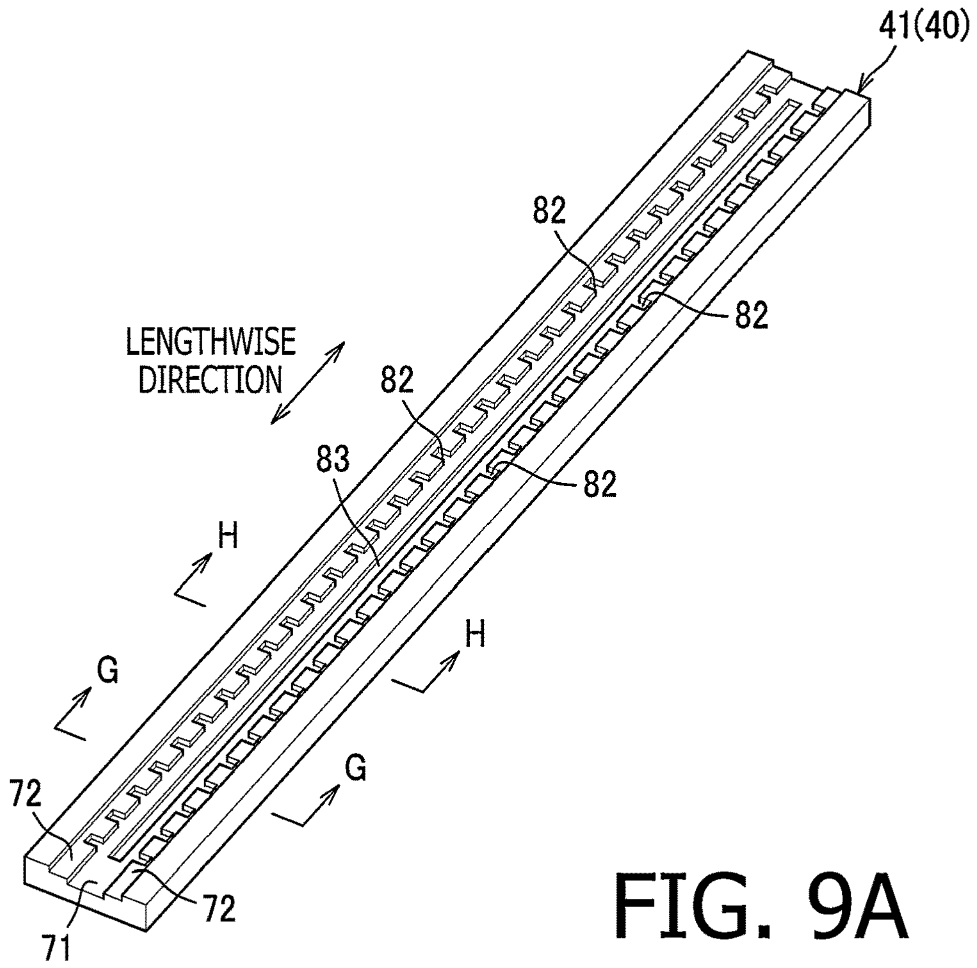
FIG. 9A is a perspective view of another holder in a fuser.
Figure 9B:
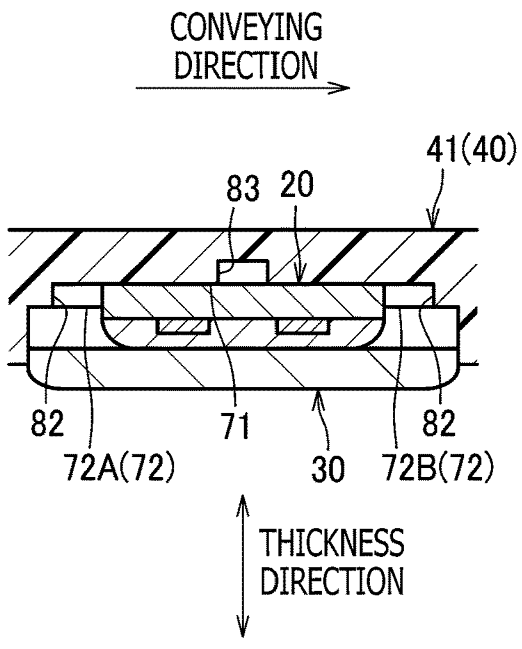
FIG. 9B is a cross-sectional view of the holder sectioned at a line G-G in FIG. 9A.
Figure 9C:
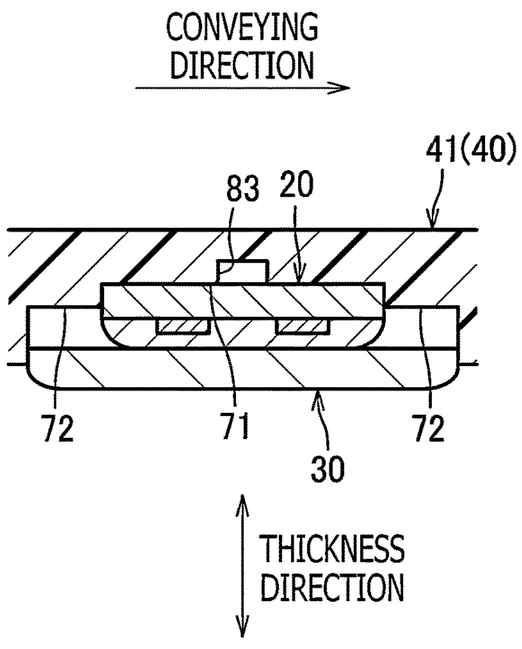
FIG. 9C is a cross-sectional view of the holder sectioned at a line H-H in FIG. 9A.

For another example, as shown in FIGS. 9A-9C illustrating a fifth modified example, the holder 40 may have a first recess 83 on the first holder surface 71 and a plurality of second recesses 82 on the second holder surface 72. The first recess 83 is deepened in the direction to be farther from the heater 20 along the conveying direction. The first recess 83 is a groove extending in the lengthwise direction. The first recess 83 is formed at the center of the first holder surface 71 in the conveying direction.

Position(s) of at least one of the second recesses 82 and a position of the first recess 83 overlap in the lengthwise direction. In the fifth modified example, positions of all of the second recesses 82 overlap the position of the first recess 83 in the lengthwise direction. The second recesses 82 are aligned with the first recess 83 in the conveying direction.

Figure 10A:
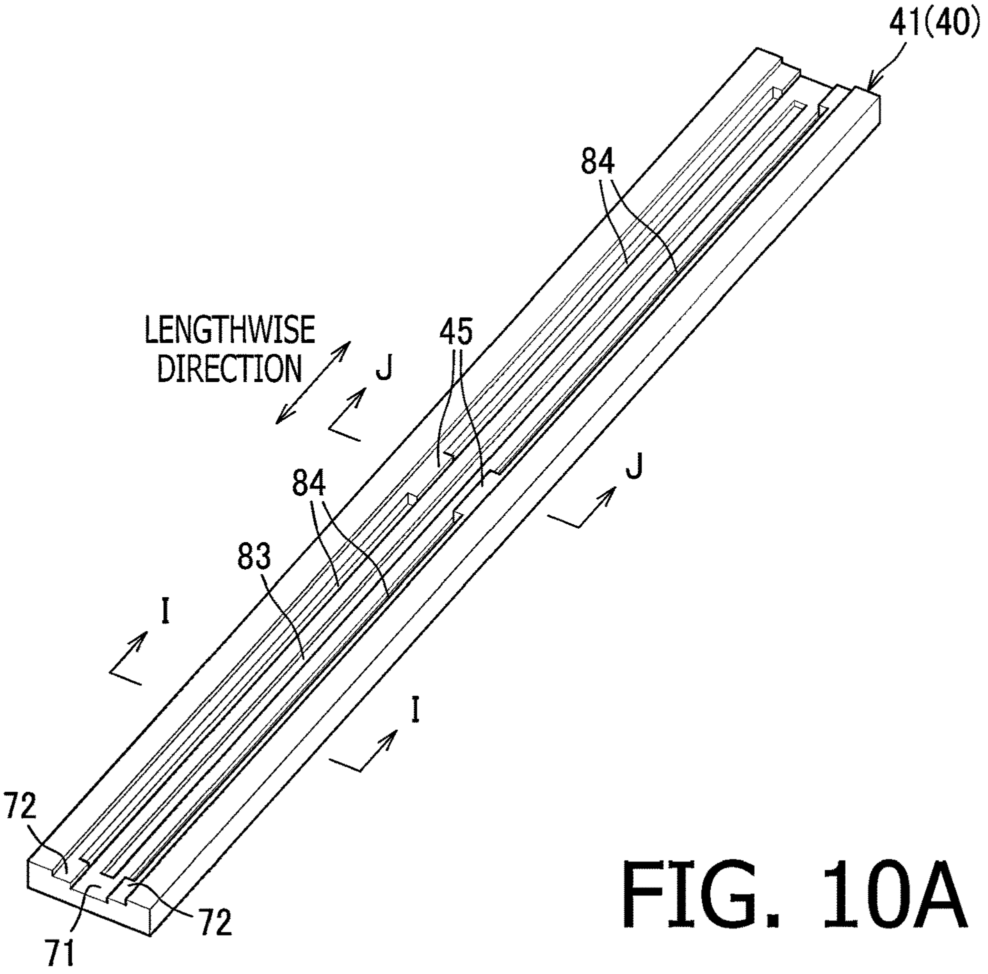
FIG. 10A is a perspective view of another holder in a fuser.
Figure 10B:
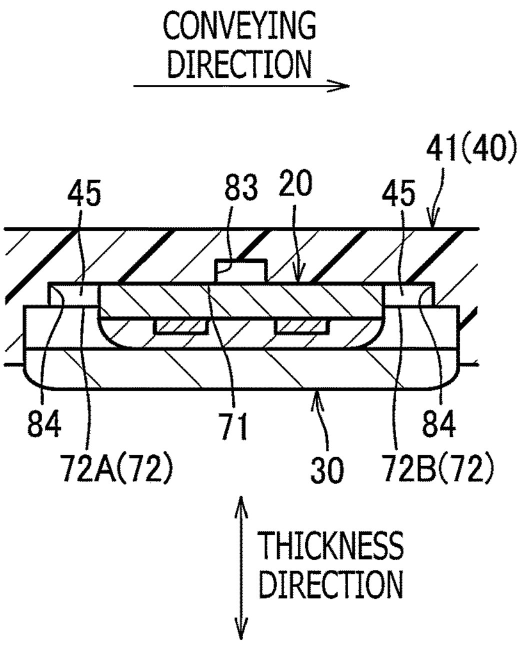
FIG. 10B is a cross-sectional view of the holder sectioned at a line I-I in FIG. 10A.

For another example, as shown in FIGS. 10A-10B illustrating a sixth modified example, the holder 40 may have a first recess 83 on the first holder surface 71 and a plurality of second recesses 84 on the second holder surface 72. Positions of the second recesses 84 and the first recess 83 overlap in the lengthwise direction. In other words, the second recesses 84 and the first recess 83 are located at the same position in the lengthwise direction. The second recesses 84 are arrayed along the first recess 83 in the conveying direction.

Figure 10C:
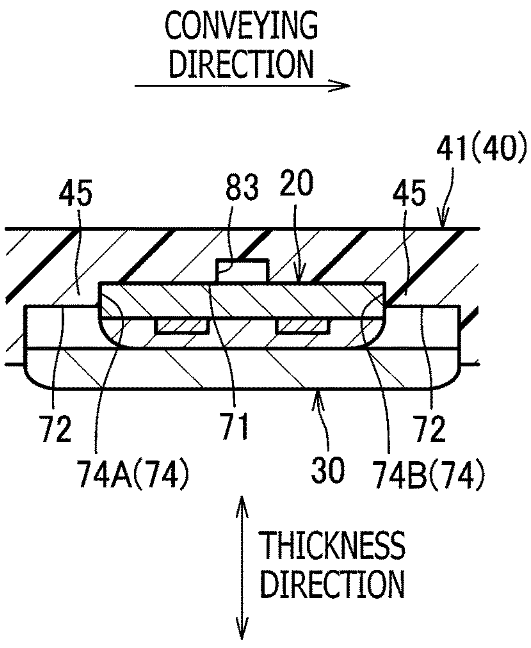
FIG. 10C is a cross-sectional view of the holder sectioned at a line J-J in FIG. 10A.

As shown in FIGS. 10A-10C, in the sixth modified example, the second recesses 84 are not formed at the center of the holder 40 in the lengthwise direction. In other words, in the sixth modified example, the holder 40 has a pair of retainer portions 45, which protrude beyond the second recesses 84 toward the heater 20 in the conveying direction. In the sixth modified example, a surface of each retainer portion 45 facing toward the heater 20 forms a part of the first gap 74.

The heater 20 is, as described above, fitted between the upstream first gap surface 74A and the downstream first gap surface 74B. In the sixth modified example, in particular, the heater 20 is fitted between the pair of retainer portions 45.

Effects that may be caused by the first through sixth modified examples of the fuser 1 will be described below.

With the first recess 81, 83 formed on the first holder surface 71, as shown in, for example, FIGS. 5B and 9C, gaps may be formed between the heater 20 and the holder 40. In other words, a heat-insulating air layer may be formed between the heater 20 and the holder 40. Therefore, the heat from the heater 20 that may otherwise dissipate through the holder 40 may be reduced. Accordingly, the heat may be conducted to the heat-conductive board 30 efficiently, and the belt 10, or in particular, the nip NP, may be heated through the heat-conductive board 30 efficiently.

With the second recesses 82, 84 formed on the second holder surface 72, as shown in, for example, FIGS. 6C and 10B, gaps between the heat-conductive board 30 and the holder 40 in the thickness direction may be increased. Therefore, the heat from the heater 20 that may otherwise dissipate through the holder 40 may be reduced. Accordingly, the heat may be conducted to the heat-conductive board 30 efficiently, and the belt 10, or in particular, the nip NP, may be heated through the heat-conductive board 30 efficiently.

As shown in FIGS. 5A-5B through 8A-8C, with the plurality of first recesses 81 formed in lines along the lengthwise direction, gaps serving as a heat-insulating layer may be formed between the heater 20 and the holder 40. Therefore, the heat from the heater 20 that may otherwise dissipate through the holder 40 may be reduced more effectively.

Moreover, by arranging the plurality of first recesses 81 along the lengthwise direction, the individual first recess 81 may be downsized. Therefore, compared to an arrangement, in which a first recess elongated in the lengthwise direction in a form of a groove is provided, an area of the first holder surface 71 may be increased. Therefore, the first holder surface 71 may support the heater 20 securely.

Moreover, by arranging the plurality of first recesses 81 along the lengthwise direction, the individual first recess 81 may be downsized. Therefore, compared to an arrangement, in which a larger first recess is provided, rigidity of the holder 40 may be improved. Similarly, as shown in FIGS. 6A-6C and 7A-7B, for example, by arranging the plurality of second recesses 82 along the lengthwise direction, the individual second recess 82 may be downsized. Therefore, compared to an arrangement, in which larger second recesses are provided, rigidity of the holder 40 may be improved. By improving the rigidity of the holder 40, the holder 40 may be prevented from being deformed by a force that may be received from the pressing roller 50.

As shown in FIGS. 9A-9C and 10A-10C, the first recess 83 may be provided in the form of a groove extending in the lengthwise direction. Therefore, compared to an arrangement, in which a plurality of smaller first recesses are arranged along the lengthwise direction, a larger gap serving as a heat-insulating air layer extending in the lengthwise direction may be formed between the heater 20 and the holder 40. Accordingly, the heat from the heater 20 that may otherwise dissipate through the holder 40 may be reduced more effectively.

The second recesses 82, 84 may be formed to open toward the heater 20 in the conveying direction. Thereby, as shown in, for example, FIGS. 6C and 10B, gaps may be formed between the heater 20 and the holder 40 in the conveying direction. In particular, gaps serving as air-insulating layers may be formed between the side surfaces of the heater 20 and the holder 40 in the conveying direction. Accordingly, the heat from the heater 20 that may otherwise dissipate through the holder 40 may be reduced more effectively.

Optionally, the second recesses 82 may not necessarily be formed to open toward the heater 20 but may be closed in the conveying direction.

Optionally, the holder 40 may not necessarily have the plurality of second recesses 82, 84 on each of the upstream and downstream second holder surfaces 72A, 72B but may have a single second recess 82, 84 on each of the upstream and downstream second holder surfaces 72A, 72B. In this arrangement, the single second recess may be, for example, in a form of a groove extending in the lengthwise direction. Moreover, optionally, at least one second recess may be formed on solely one of the upstream second holder surface 72A and the downstream second holder surface 72B.

Optionally, the holder may not necessarily have the second recess but may have the first recess(es) alone. For another example, the holder may not necessarily have the first recess but may have the second recess(es) alone.

Figure 11A:
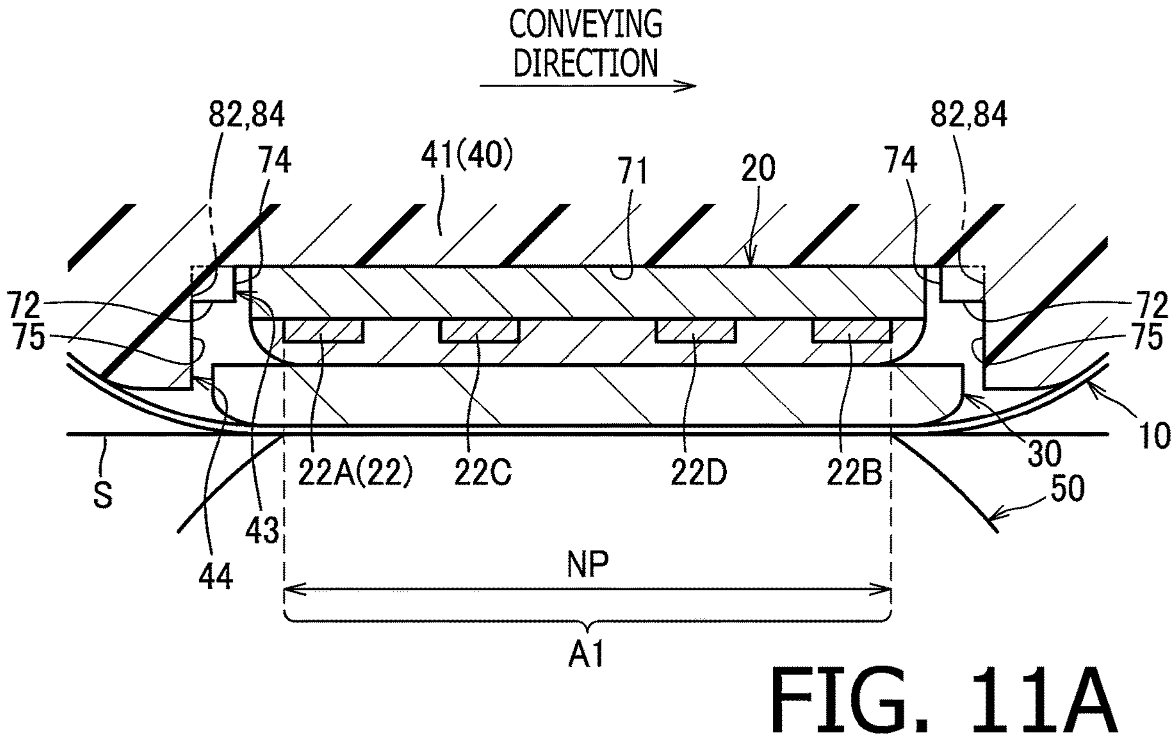
FIG. 11A is a cross-sectional partial view of another holder in a fuser.
Figure 11B:
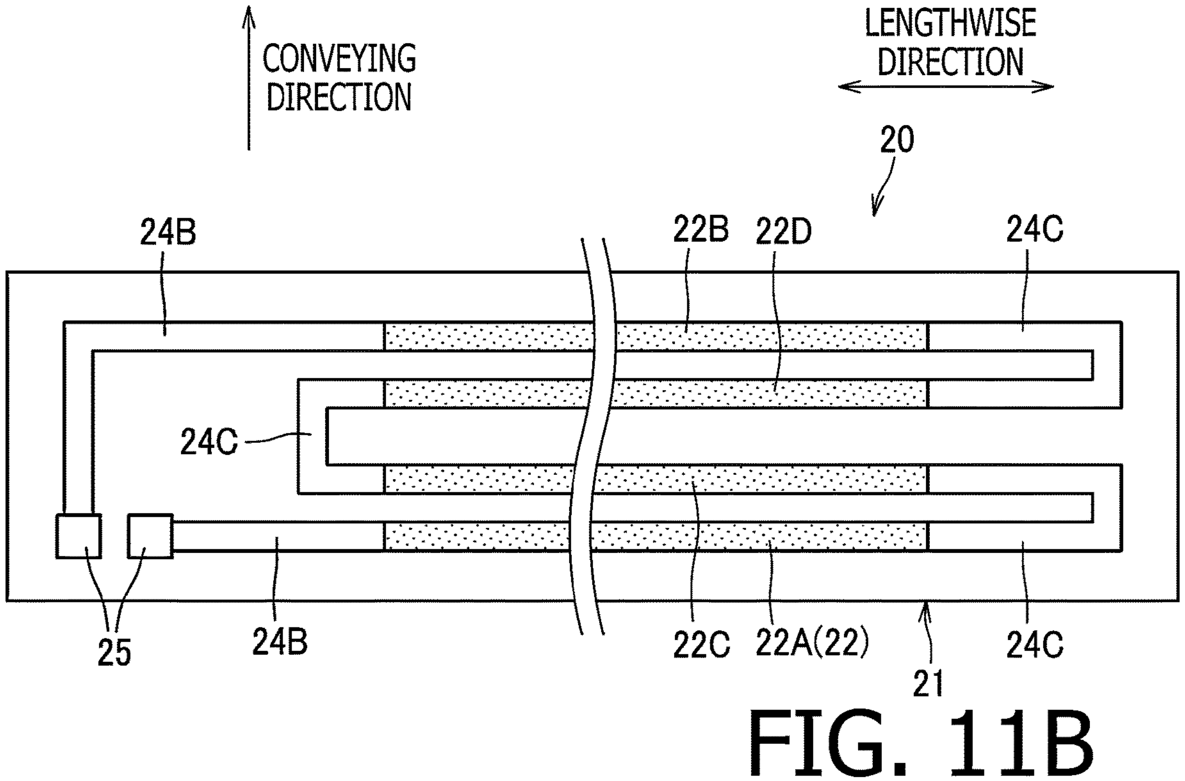
FIG. 11B is a plan view of a heater in the fuser shown in FIG. 11A.

For another example, as shown in FIGS. 11A-11B illustrating a seventh modified example, the heater 20 may have a first resistance heating element 22A, a second resistance heating element 22B, a third resistance heating element 22C, and a fourth resistance heating element 22D, which form the resistance heating element 22. The first through fourth resistance heating elements 22A-22D extend in the lengthwise direction. The first, third, fourth, and second resistance heating elements 22A, 22C, 22D, 22B may be arrayed in this given order from upstream to downstream along the conveying direction.

The first resistance heating element 22A and the third resistance heating element 22C are spaced apart from each other in the conveying direction and extend in parallel to each other. The third resistance heating element 22C and the fourth resistance heating element 22D are spaced apart from each other in the conveying direction and extend in parallel to each other. The fourth resistance heating element 22D and the second resistance heating element 22B are spaced apart from each other in the conveying direction and extend in parallel to each other.

One end of the first resistance heating element 22A in the lengthwise direction and one end of the third resistance heating element 22C in the lengthwise direction are connected through a conductive wire 24C. One end of the second resistance heating element 22B in the lengthwise direction and one end of the fourth resistance heating element 22D in the lengthwise direction are connected through a conductive wire 24C.

The other end of the third resistance heating element 22C in the lengthwise direction and the other end of the fourth resistance heating element 22D in the lengthwise direction are connected through a conductive wire 24C. The other ends of the first resistance heating element 22A and the second resistance heating element 22B in the lengthwise direction are each connected with one end of a conductive wire 24B, and the other end of each conductive wire 24B is connected to a power-supply terminal 25.

In the seventh modified example, one end of the nip NP in the conveying direction is located at the same position as one end of the region A1, in which the resistance heating element 22 ranges, and the other end of the nip NP in the conveying direction is located at the same position as the other end of the region A1, in which the resistance heating element 22 ranges. In particular, the upstream end of the nip NP in the conveying direction is located at the same position as an upstream end of the first resistance heating element 22A, and the downstream end of the nip NP in the conveying direction is located at the same position as the downstream end of the second resistance heating element 22B.

In the conveying direction, the region A1, in which the resistance heating element 22 ranges, is located at the same position as the range of the nip NP. Therefore, the heater 20 may heat the nip NP efficiently.

It may be noted that the quantity and the arrangement of the resistance heating elements are not necessarily be limited. Optionally, for example, the heater may have a resistance heating element, of which heat generation rate is higher in a central part in the lengthwise direction and lower in end parts in the lengthwise direction, and a resistance heating element, of which heat generation rate is higher in end parts in the lengthwise direction and lower in a central part in the lengthwise direction, and the resistance heating elements may be controlled separately in order to adjust the heat distribution in the lengthwise direction in the heater preferably.

For another example, the heater 20 may not necessarily be fitted in the first locator groove 43 in the holder 40 but may be, as shown in FIG. 11A, located in the first locator groove 43 with clearances formed between the side surfaces of the first locator groove 43, i.e., the first gaps 74, and the heater 20. In this arrangement, the heat from the heater 20 that may otherwise dissipate through the holder 40 may be reduced.

It may be noted that, in the seventh modified example, the holder 40 has the second recesses 82, 84 (see virtual lines in FIG. 11A), which are open in the conveying direction toward the heater 20, on the second holder surface 72. Therefore, clearances are formed between the heater 20 and the holder 40 in the conveying direction. In particular, clearances between the side surfaces of the heater 20 and the holder 40 in the conveying direction may be increased. Accordingly, the heat from the heater 20 that may otherwise dissipate through the holder 40 may be reduced.

For another example, the heat-conductive board 30 may not necessarily be fitted in the second locator groove 44 in the holder 40 but may be, as shown in FIG. 11A, located in the second locator groove 44 with clearances formed between the side surfaces of the second locator groove 44, i.e., the second gaps 75, and the heat-conductive board 30. In this arrangement, the heat in the heat-conductive board 30 that may otherwise dissipate through the holder 40 may be reduced.

Figure 12:
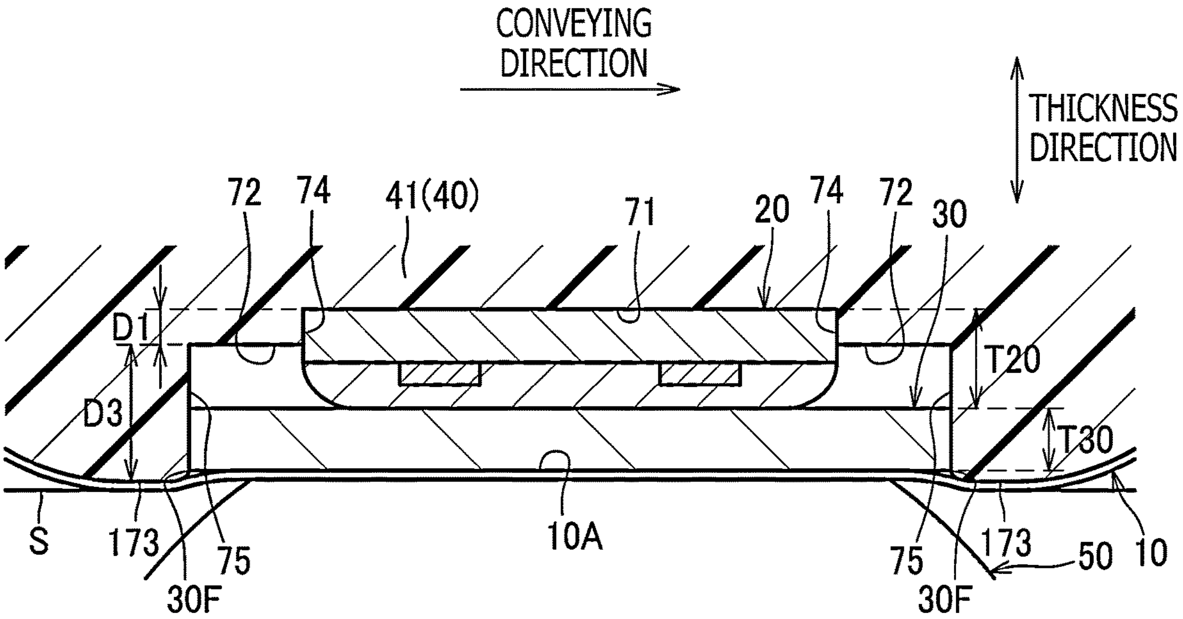
FIG. 12 is a cross-sectional partial view of another holder in a fuser.

For another example, the heat-conductive board 30 may not necessarily be protrude toward the pressing roller 50 beyond the third holder surface 73 in the thickness direction. As shown in FIG. 12 illustrating an eighth modified example, the third holder surface 173 may protrude toward the pressing roller 50 beyond the heat-conductive board 30 in the thickness direction.

The third holder surface 173 faces the inner circumferential surface 10A of the belt 10 in the thickness direction. The third holder surface 173 is located on sides of the second holder surface 72 in the conveying direction opposite to the first holder surface 71. The third holder surface 173 is located closer to the pressing roller 50 than the second holder surface 72 in the thickness direction. The second gap 75 is formed between the third holder surface 173 and the second holder surface 72.

According to the eighth modified example, a sum of the thickness T20 of the heater 20 and the thickness T30 of the heat-conductive board 30 is smaller than a sum of the dimension D1 of the first gap 74 in the thickness direction and the dimension D3 of the second gap 75 in the thickness direction. The third holder surface 173 has a form to curve along inner circumferential surface 10A of the belt 10. The inner circumferential surface 10A of the belt 10 is in contact with the third holder surface 173. The third holder surface 173, in conjunction with the guides 42 and the guide ribs 42A (see FIG. 1), may guide the belt 10 rolling around the heater 20.

By the third holder surface 173 of the holder 40 protruding beyond the heat-conductive board 30 toward the pressing roller 50 in the thickness direction, the belt 10 may be prevented from contacting edges 30F of the heat-conductive board 30 in the conveying direction.

According to the eighth modified example, the edges 30F of the heat-conductive board 30 may not contact the belt 10. Therefore, the edges 30F of the heat-conductive board 30 may not necessarily be rounded. For example, a curvature radius of the edge 30F may be smaller than 0.3 mm.

For another example, the heat-conductive board 30 may not necessarily include the coating layer 32.

For another example, the upstream end and the downstream end of the heat-conductive board 30 in the conveying direction may not necessarily be located upstream and downstream of the upstream end and the downstream end of the nip NP in the conveying direction, respectively, but the upstream end of the heat-conductive board 30 in the conveying direction may be located at the same position as the upstream end of the nip NP in the conveying direction, and/or the downstream end of the heat-conductive board 30 in the conveying direction may be located at the same position as the downstream end of the nip NP in the conveying direction.

For another example, the upstream end and the downstream end of the heat-conductive board 30 in the conveying direction may not necessarily be located upstream and downstream of the upstream end and the downstream end of the heater 20 in the conveying direction, respectively, but the upstream end of the heat-conductive board 30 in the conveying direction may be located at the same position as the upstream end of the heater 20 in the conveying direction, and/or the downstream end of the heater 20 in the conveying direction may be located at the same position as the downstream end of the heater 20 in the conveying direction.

For another example, the heat-conductive member may not necessarily be in the form of the board such as the heat-conductive board 30 but may be, for example, in a thinner form than the heat-conductive board 30 such as sheet, e.g., a heat-conductive sheet, or film, e.g., a heat-conductive film.

For another example, the second holder surface 72 may not necessarily be located both upstream and downstream of the first holder surface 71 in the conveying direction but may be located on one of upstream and downstream of the first holder surface 71 in the conveying direction alone. Moreover, the third holder surface may not necessarily be located both upstream and downstream of the first holder surface 71 in the conveying direction but may be located on one of upstream and downstream of the first holder surface 71 in the conveying direction alone.

For another example, the resistance heating element 22 may not necessarily be arranged on the first surface 20A of the heater 20 but may be arranged on the second surface of the heater 20.

For another example, the rotatable heating member may not necessarily be limited to the rolled belt 10 but may be, for example, a rolled film. Moreover, the rotatable pressing member may not necessarily be limited to the pressing roller 50 but may be formed of, for example, a rolled belt and an elastic pad located inside the rolled belt, and the belt may be nipped between the elastic pad and the rotatable heating member.

Optionally, the elements described in the embodiment and the modified examples may be combined.

What is claimed is:

1. A fuser, comprising:

a rotatable heating member in a form of a roll;

a heater in a form of a board located inside the rotatable heating member, the heater having a first surface and a second surface opposite to the first surface in a thickness direction of the heater;

a rotatable pressing member forming a nip in conjunction with the rotatable heating member, the rotatable pressing member being configured to convey a sheet in a conveying direction in conjunction with the rotatable heating member, the conveying direction intersecting orthogonally with a lengthwise direction of the heater and with the thickness direction of the heater;

a heat-conductive member located between an inner circumferential surface of the rotatable heating member and the first surface of the heater in the thickness direction, the heat-conductive member nipping the rotatable heating member in conjunction with the rotatable pressing member; and a holder located inside the rotatable heating member, the holder supporting the heater, wherein a dimension of the heat-conductive member in the conveying direction is greater than a dimension of the heater in the conveying direction, wherein the holder comprises:

a first holder surface extending in the conveying direction and supporting the second surface of the heater in the thickness direction; and a second holder surface located at least either upstream or downstream of the first holder surface in the conveying direction, the second holder surface facing the heat-conductive member, the second holder surface being located closer than the first holder surface to the heat-conductive member in the thickness direction, the first holder surface and the second holder surface being connected by a gap surface, and wherein a thickness of the heater is greater than a length of the gap surface in the thickness direction.

2. The fuser according to claim 1, wherein the second holder surface is located both upstream and downstream of the first holder surface in the conveying direction, the gap surface includes an upstream gap surface and a downstream gap surface located downstream of the upstream gap surface, the first holder surface and the second holder surface located upstream of the first holder surface in the conveying direction being connected by the upstream gap surface, the first holder surface and the second holder surface located downstream of the first holder surface in the conveying direction being connected by the downstream gap surface, and the heater is fitted in a recess defined by the first holder surface, the upstream gap surface, and the downstream gap surface.

3. The fuser according to claim 1, wherein the holder includes a third holder surface located on a side of the second holder surface opposite in the conveying direction to the first holder surface, the third holder surface facing the inner circumferential surface of the rotatable heating member, the third holder surface being located closer to the rotatable pressing member than the second holder surface in the thickness direction, and the heat-conductive member protrudes toward the rotatable pressing member beyond the third holder surface in the thickness direction.

4. The fuser according to claim 3, wherein the heat-conductive member has a rounded edge contactable with the rotatable heating member.

5. The fuser according to claim 1, wherein the holder includes a third holder surface located on a side of the second holder surface opposite in the conveying direction to the first holder surface, the third holder surface facing the inner circumferential surface of the rotatable heating member, the third holder surface being located closer to the rotatable pressing member than the second holder surface in the thickness direction, and the third holder surface protrudes toward the rotatable pressing member beyond the heat-conductive member in the thickness direction.

6. The fuser according to claim 1, wherein the holder includes at least one first recess on the first holder surface.

7. The fuser according to claim 6, wherein the holder includes at least one second recess on the second holder surface.

8. The fuser according to claim 7, wherein the at least one first recess includes a plurality of first recesses aligned in the lengthwise direction, the at least one second recess includes a plurality of second recesses aligned in the lengthwise direction, and positions of the plurality of first recesses in the lengthwise direction and positions of the plurality of second recesses in the lengthwise direction are different.

9. The fuser according to claim 7, wherein the at least one first recess includes a plurality of first recesses aligned in the lengthwise direction, the at least one second recess includes a plurality of second recesses aligned in the lengthwise direction, and positions of at least one of the plurality of first recesses and at least one of the plurality of second recesses overlap in the lengthwise direction.

10. The fuser according to claim 7, wherein the at least one first recess includes a plurality of first recesses aligned in the lengthwise direction, the at least one second recess includes at least one second recess being a groove extending in the lengthwise direction, and positions of at least one of the plurality of first recesses and the at least one second recess overlap in the lengthwise direction.

11. The fuser according to claim 7, wherein the at least one first recess includes a groove extending in the lengthwise direction, the at least one second recess includes a groove extending in the lengthwise direction, and positions of the at least one first recess and the at least one second recess overlap in the lengthwise direction.

12. The fuser according to claim 7, wherein the at least one first recess includes a groove extending in the lengthwise direction, the at least one second recess includes a plurality of second recesses aligned in the lengthwise direction, and positions of at least one of the plurality of second recesses and the at least one first recess overlap in the lengthwise direction.

13. The fuser according to claim 12, wherein, in the lengthwise direction, one end of the rotatable heating member is located farther than one end of the heat-conductive member from a center of the heat-conductive member, and the other end of the rotatable heating member is located farther than the other end of the heat-conductive member from the center of the heat-conductive member.

14. The fuser according to claim 7, wherein the at least one second recess is open in the conveying direction toward the heater.

15. The fuser according to claim 6, wherein the holder includes a plurality of first recesses aligned in the lengthwise direction.

16. The fuser according to claim 1, wherein, in the conveying direction, an upstream end of the heat-conductive member is located upstream of an upstream end of the heater, and a downstream end of the heat-conductive member is located downstream of a downstream end of the heater.

17. The fuser according to claim 1, wherein, in the conveying direction, an upstream end of the heat-conductive member is located upstream of an upstream end of the nip, and a downstream end of the heat-conductive member is located downstream of a downstream end of the nip.

18. The fuser according to claim 1, wherein the heater includes a base board and a resistance heating element supported by the base board, in the conveying direction, an upstream end of the nip is located at the same position as, or upstream of, an upstream end of a region, in which the resistance heating element ranges, and in the conveying direction, a downstream end of the nip is located at the same position as, or downstream of, a downstream end of the region, in which the resistance heating element ranges.

19. The fuser according to claim 1, wherein, in the lengthwise direction, one end of the heat-conductive member is located farther from a center of the rotatable pressing member than one end of the rotatable pressing member, and the other end of the heat-conductive member is located farther from the center of the rotatable pressing member than the other end of the rotatable pressing member.

20. The fuser according to claim 1, wherein the heat-conductive member includes:

a base; and a coating layer, the coating layer covering at least a part of a surface of the base, the coating layer being in contact with the inner circumferential surface of the rotatable heating member, the coating layer being made of a material, of which sliding properties are higher than sliding properties of the base.

21. The fuser according to claim 1, wherein the first surface faces the heat-conductive member, and the second surface faces away from the heat-conductive member.

22. The fuser according to claim 1, wherein the second holder surface faces the heat-conductive member in the thickness direction.

* * * * *